Figure 1A:
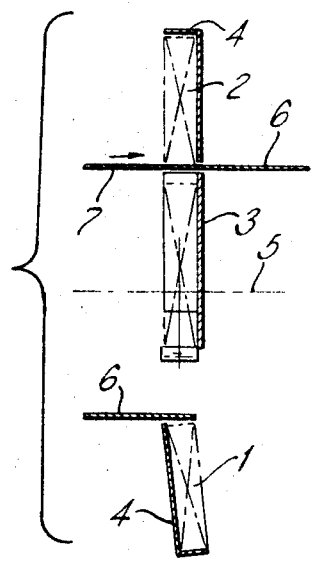

United States Patent

[11] 3,595,413

| [72] | Inventor | James George Edward Hillman<br>London, England |
|---|---|---|
| [21] | Appl. No. | 702,981 |
| [22] | Filed | Feb. 5, 1968 |
| [45] | Patented | July 27, 1971 |
| [73] | Assignee | Molins Machine Company Limited<br>London, England |
| [32] | Priority | Feb. 6, 1967 |
| [33] | | Great Britain |
| [31] | | 5607/67 |

[54] MACHINE FOR UNLOADING TRAYS OF ARTICLES
36 Claims, 9 Drawing Figs.

[52] U.S. Cl. .................................................. 214/302,
214/152, 214/307, 214/312
[51] Int. Cl. .................................................. B65b 69/00
[50] Field of Search .................................................. 214/301,
302, 312, 313, 314, 300; 198/57, 58

[56] References Cited
UNITED STATES PATENTS

| 1,964,597 | 6/1934 | Rapellin | 221/227 |
|---|---|---|---|
| 2,902,196 | 9/1959 | Gray | 221/227 |
| 1,465,050 | 8/1923 | Kinsley | 198/58 X |
| 2,528,884 | 11/1950 | Hemovich | 214/314 |
| 2,977,006 | 3/1961 | Curry | 214/301 |
| 2,799,413 | 7/1957 | Innocenti | 214/302 |
| 3,229,837 | 1/1966 | Schermund | 214/312 |
| 3,332,560 | 7/1967 | Niepmann | 214/302 |

Primary Examiner—Robert G. Sheridan
Attorneys—Emory L. Groff and Emory L. Groff, Jr.

ABSTRACT: A machine for unloading trays of cigarettes having two carriers for trays which move intermittently along a circular path in a vertical plane from a lower tray-receiving position to invert the trays over a hopper into which the cigarettes are emptied from each tray in turn and from the bottom of which they are removed on a conveyor in a continuous stream.

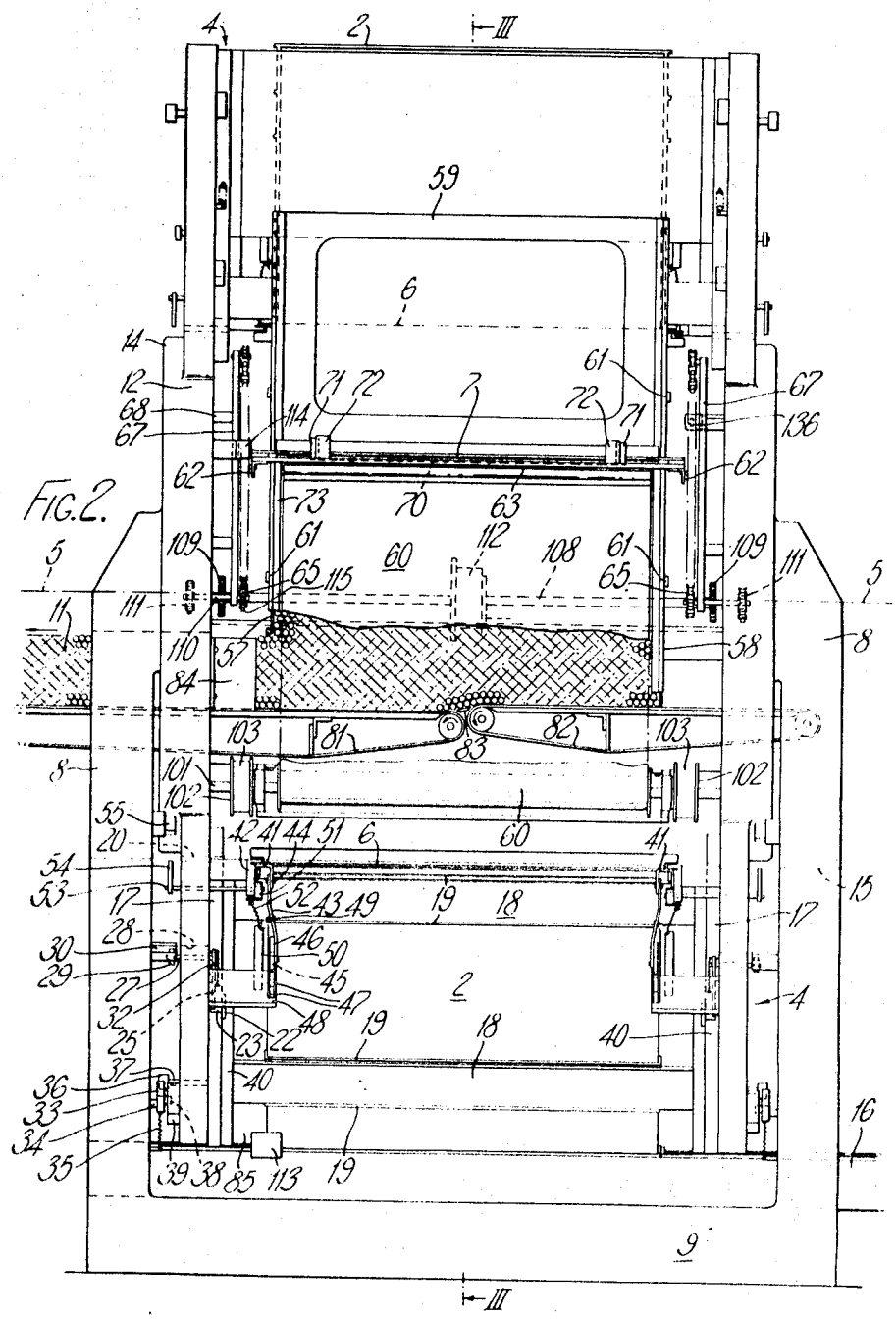

MACHINE FOR UNLOADING TRAYS OF ARTICLES

This invention relates to improvements in the production of streams of articles and is particularly concerned with methods of and apparatus for the production of continuous streams of parallelly aligned rodlike articles moving transversely to their lengths from containers charged with the articles in parallel alignment.

In the cigarette industry it is frequent practice to convey cigarettes from cigarette-making machines in trays, each of which may hold several thousand cigarettes, to machines where they are packed. One of the problems which arises is that of getting the cigarettes out of the trays and delivering them to the packing machines. The problem becomes greater with the advent of packing machines that operate at considerably higher speeds than has heretofore be usual, and therefore demand a correspondingly greater supply of cigarettes. In general a convenient way to feed the cigarettes to the packets is in a continuous stream but it is difficult to form such a stream in an orderly fashion at high speed.

It is an object of this invention to provide improved methods and apparatus for the production of a continuous stream of rodlike articles such as, for example, cigarettes.

According to one aspect of the present invention there is provided a method of producing a continuous stream of parallelly aligned rodlike articles moving transversely to their lengths, comprising emptying the articles downwardly out of each in turn of a succession of containers charged with articles in parallel alignment into a hopper having sides to limit horizontal movement of the articles, constraining the articles against relative vertical movement during downward descent through the hopper to assist in maintaining their alignment, and continuously removing the articles from the hopper to form said stream.

Preferably there is produced in the hopper a mass of articles from which said stream is formed and the mass is constrained to define a generally flat and horizontal upper surface thereto. The method can comprise urging the articles downwardly through the hopper.

The method can comprise lowering the articles downwardly from each container in turn into the hopper and supporting the articles during their downward movement. For containers with an open top and an article-supporting bottom the method can comprise inverting the containers in succession to empty the articles out through the open top.

The method can also extend to delivering the stream of articles to packing apparatus and continuously packing the articles.

In another aspect the invention provides apparatus for forming a continuous stream of parallelly aligned rodlike articles moving transversely to their lengths from containers charged with the articles in parallel alignment, comprising a hopper for the articles having sides to limit horizontal movement of the articles, means to deliver the charged containers in succession to the hopper, means to empty articles downwardly into the hopper from each in turn of the containers, means to remove articles continuously from the hopper to form the continuous stream, and means to constrain the articles against relative vertical movement during downward descent through the hopper to assist in maintaining their alignment.

Preferably the continuous stream of articles is produced from a mass of articles in the hopper and means are provided to constrain the mass to define a generally flat and horizontal upper surface thereto. The apparatus can comprise means to urge the articles downwardly through the hopper. It can also comprise a horizontal platform which is vertically movable in the hopper to act on the upper level of articles in the hopper.

Preferably the apparatus comprises means to lower the articles downwardly from each container in turn into the hopper and to support the articles during their downward movement. There can be provided a moving platform to lower the articles and to support them, which platform is retractable horizontally to allow supported articles to rest on articles already in the hopper.

The apparatus can also comprise means to position charged containers above the hopper so that articles in a container are in vertical alignment with the hopper and means to move the platform horizontally above the hopper into a position beneath the articles.

In one embodiment the path is a circular one lying in a vertical plane and embracing the hopper and the number of trays is two, their spacing being 180°.

Figure 3:
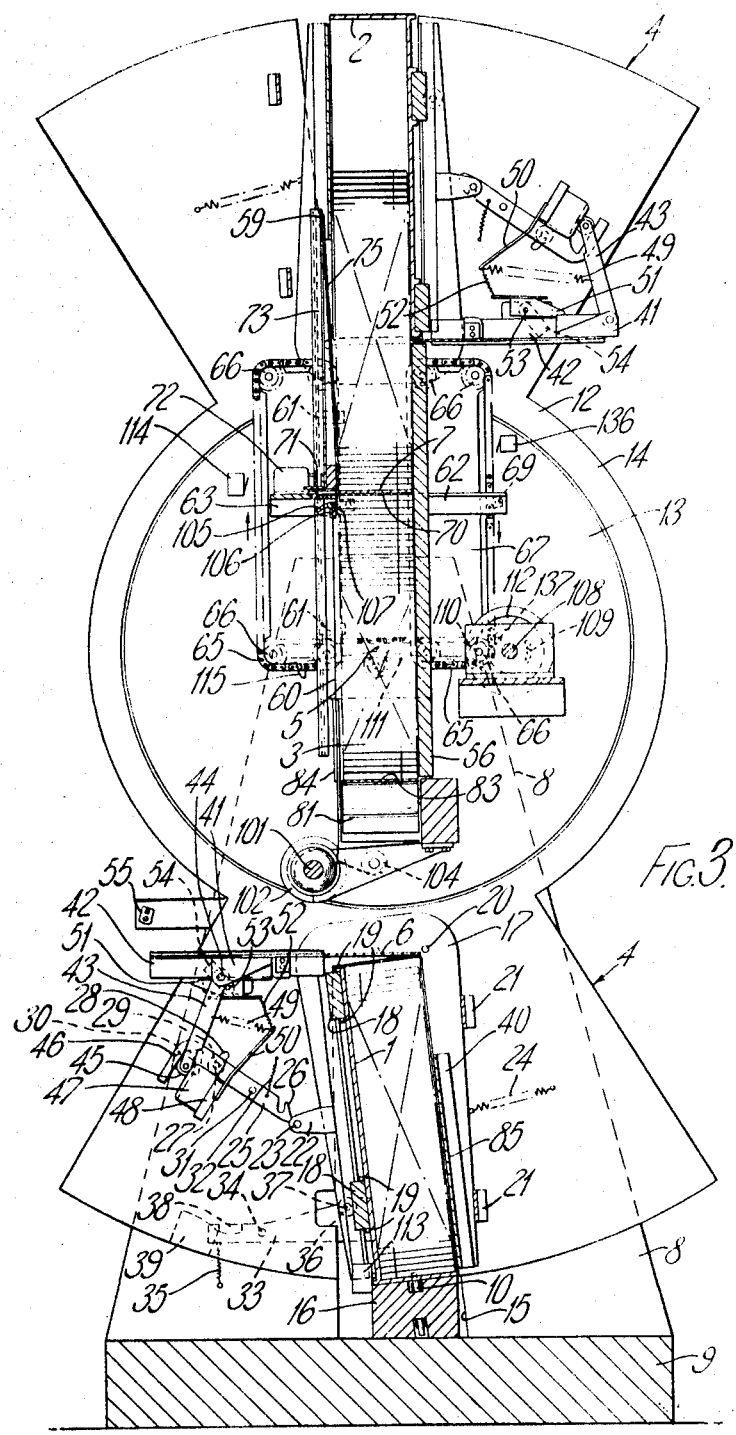
Figure 5:
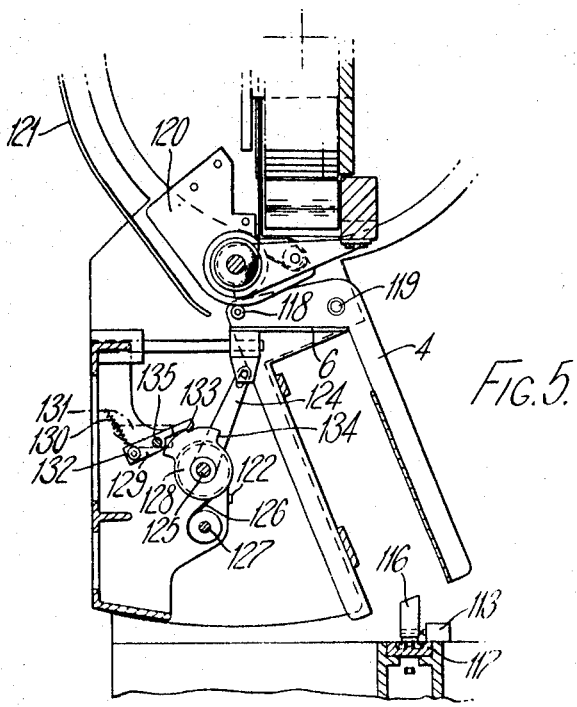
Figure 4:
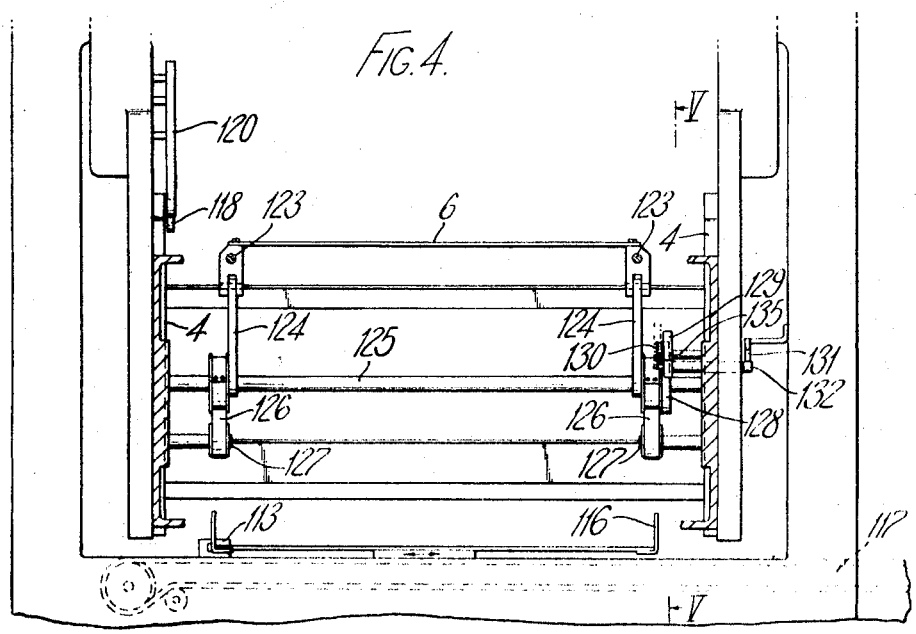

Apparatus according to the invention will now be described, by way of example, with reference to the accompanying drawings, in which:

FIGS. 1(a) to 1(e) are a series of schematic views showing several stages in the operation of an unloader for trays of cigarettes, FIG. 2 is a front elevation of the tray unloader, FIG. 3 is a section on the line III—III of FIG. 2, FIG. 4 is a view similar to FIG. 2 of part of a modified tray unloader and FIG. 5 is a section on the line V—V of FIG. 4.

Referring to FIG. 1 of the drawings, five views (a) to (e) depict successive positions during a cycle of operation of the unloader. In position (a) a full tray 1 of cigarettes has just been picked up by the unloader and a further tray 2 which was picked up immediately before the tray 1 and has been inverted is about to be unloaded into a hopper 3 which contains cigarettes from the tray which preceded tray 2 and which hopper is discharging these in a continuous stream perpendicular to the paper from its lower end. The trays are rectangular and have an open front and an open top. Each tray is carried in a tray holder 4 mounted to be rotatable in the plane of the drawing about an axis through the line 5 to revolve around the hopper 3. The tray holders 4 each support a transversely movable leaf 6. A travelling platform 7 which does not rotate with the tray holders is movable both horizontally and vertically as indicated by the arrows to traverse a rectangular path. The rotary part of the machine moves in steps of 180° between the two vertical positions where it is locked in place while unloading proceeds.

Figure 1B:
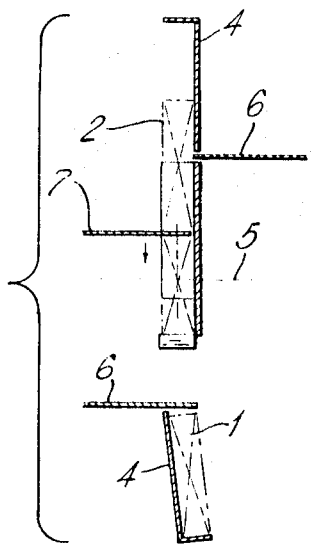
Figure 1C:
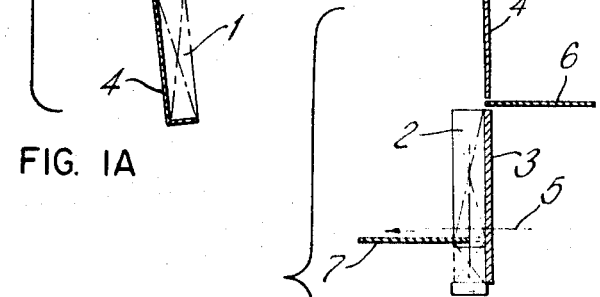
Figure 1D:
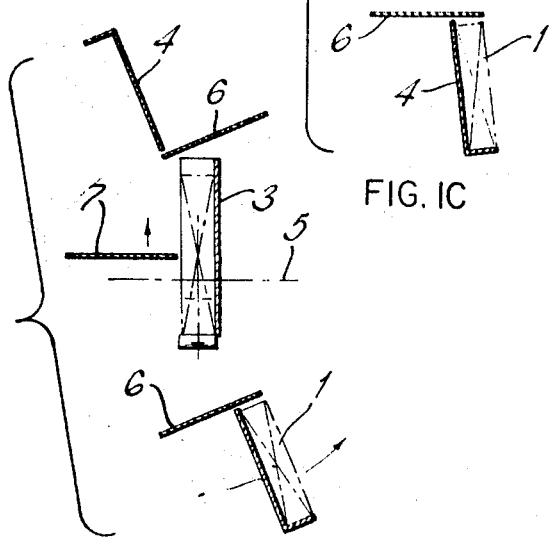
Figure 1E:
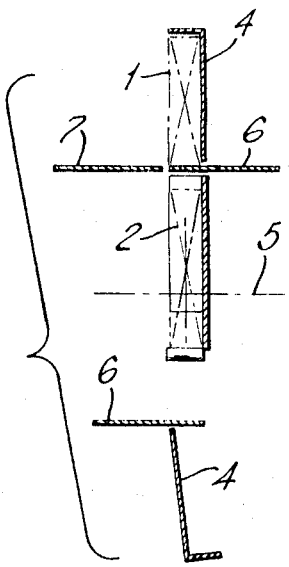

Commencing at the position shown in FIG. 1(a) the platform 7, which is here supporting the cigarettes in the inverted tray 2, is gradually lowered down the hopper 3 while the cigarettes are run out of the hopper, as is shown in FIG. 1(b). When the topmost row of cigarettes is clear of the lower edge of the tray 2, FIG. 1(c), the platform 7 is retracted from the magazine and the tray holders 4 are rotated, FIG. 1(d), bringing the upper one down to the lowermost position ready to exchange its now empty tray for a full one, and swinging the tray 1 up to the unloading position. This movement inverts the tray so that the cigarettes can be unloaded through the open top of the tray under the action of gravity, and is carried out sufficiently quickly to ensure that the cigarettes remain in place in the tray. During rotation the weight of the cigarettes is transferred from the tray to the leaf 6 which is overlying the top of the tray. In addition the leaf 6 of the tray holder 4 moving from the upper to the lower position is moved across the tray holder so that it will overlie the top of the next full tray, and at the same time the platform 7 returns to the top of the hopper 3. Between positions 1(e) and 1(a) platform 7 pushes leaf 6 back across the hopper 3 and takes the weight of the cigarettes in the tray.

The more detailed construction and operation of the tray unloader will now be described with reference to FIGS. 2 and 3.

In the unloader a pair of tray holders, indicated generally at 4 are carried for rotation about a horizontal axis to revolve around the hopper 3, in a pair of supports 8 mounted on a base 9. Trays are supplied to and removed from the machine on a horizontal conveyor 10 which runs below the axis of rotation and parallel therewith, passing through apertures 15 in the supports 8. Cigarettes are discharged in a continuous stream 11 a little below the axis and in a direction parallel therewith through a further aperture in one of the supports 8 to the hopper of a cigarette-packing machine. The tray holders 4 are mounted diametrically opposite each other between the wings of a pair of butterfly-shaped members 12 the central body portions of which are apertured to receive discs 13 carried on the upper ends of the supports 8. The members 12 and the discs 13 together constitute the bearings for the rotation of the tray holders 4. The butterfly members 12 each have an outwardly projecting circular shoulder 14 concentric with the axis for the application of drive to the rotating part of the unloader. This can be facilitated by securing a chain to extend along each shoulder thereby providing a surface which is geared for engagement with a driving cog.

The trays such as 1 and 2 each comprise a rectangular box having an open front and an open top, cigarettes being stacked in the trays in side-by-side relationship so that each extends endwise across the thickness of the box. In the case of tipped cigarettes there is a difference in the thicknesses of the cigarette at its ends and if, as is usual, the cigarettes are stacked in the trays with their tips against the backwall of the tray, the upper cigarettes slope towards the open front, tending to fall out. To counteract this the trays are transported with a slight backward tilt.

A loading ramp 16, along which the conveyor 10 runs, is mounted on the base 9 between the apertures 15 in the supports 8 to provide a stand for the trays at the moment of entering or leaving the unloader and its upper sloping surface acts to maintain the tilt with which trays are delivered to the unloader. The tray holders 4 are designed to receive the trays endwise through the apertures 15 and for this purpose cutaways are formed in the appropriate places in the butterfly members 12. The construction of the holders is most clearly shown with reference to the lowermost holder as seen in FIG. 3 in which the machine is shown picking up the full tray 1 from the ramp 16. Each holder 4 comprises a pair of U-pieces 17, one secured to each butterfly member 12 to embrace the aperture therein and a pair of struts 18 connecting the U-pieces across one limb of each piece and the other limb carries a support 40 for a plate 85 which extends across the front of the tray to hold the cigarettes in position. Each tray has ribs 19 running across the outer face of its backwall and the struts 18 engage with these ribs to locate the trays in the holders. In order to swing the tray 1 between the position shown and a radial position the U-pieces are mounted on the butterfly members 12 by pivots 20. The resulting pivotal movement is limited by padded stops 21 and controlled by two sets of releasable locking mechanisms which are operated by cam means as the holders rotate, firstly, to lock the lowermost holder into a radially aligned carrying position as it advances from the position shown until it once more approaches that position, and secondly, to lock the holder in position on the ramp 16. To cooperate with the first locking mechanism the strutted limb of each of the four U-pieces 17 on the machine is provided with a lug 22 carrying a locking peg 23, and the other limb of each U-piece is connected with a spring 24 secured to the member 12 to bias the holders in the direction of rotation of the tray holders, which is anticlockwise as viewed in FIG. 3. Four similar locking mechanisms constitute the first of the above-mentioned sets, one being provided for each U-piece 17 and each comprising a locking arm 25 one end of which is formed with a hook 26 to engage the peg 23 and the other end of which carries one end of a shaft 27 which extends through an arcuate slot 28 in the member 12 and is provided on the other side of member 12 with a cam follower roller 29 which engages with a cam block 30 on the support 8 as the machine rotates. The lever 25 is pivoted to the member 12 at 31 and is biased in an anticlockwise direction (as viewed in FIG. 3) by a spring 32 which acts to lock the hook 26 on the peg 23. As the follower roller 29 strikes the cam block 30 the lever 25 is pivoted against the spring 32 to disengage the hook 26 from the peg 23 and release the holder. The slot 28 accommodates and limits the movement of the shaft 27 and thus limits the travel of the locking arm 25.

The second set comprises a pair of locking mechanisms mounted one to each support 8 in the vicinity of the loading ramp 16. Each of these comprises a more or less horizontally disposed latch bar 33 pivoted to the support 8 at 34 and biased in a clockwise direction (FIG. 3) by a spring 35. The strutted limb of each U-piece carries a roller 36 on a shaft 37 and the upper surface of the latch bar is cammed and formed at its free end with a cup to lock on this roller 36. The biased end is formed with a projecting shoulder 38, and a cam block 39 is mounted on the outer side of the butterfly member 12 in such a position as to strike the shoulder 38 and release the roller 36 from the latch as the tray holders move on from the loading position shown.

The movable leaf 6 associated with each tray holder is mounted at its ends on carriages 41 for movement in slides 42, into and out of position across the open top of the tray 1 or 2. Each carriage is urged into position by means of a floating link 43 having one end pivoted to the carriage at 44 and having at its other end a roller 45 which runs in a U-shaped track defined by an element 46 mounted between guide plates 47 secured to a block 48 fixed to the member 12. A spring 49 fixed to an arm 50 which is carried by the fixed block 48 urges the link 43 in the appropriate direction.

A latch is provided to lock the leaf 6 in the position where it is pushed by the travelling platform 7 and this latch comprises, for each carrier 41, a rider 51 which is recessed to engage an edge of the carrier and which is biased to ride thereon by a spring 52 which is also secured to the arm 50. This is most clearly shown in the upper part of FIG. 3. The rider 51 is pivoted to the slide 42 by means of a shaft 53 on which it is mounted and which, passing through apertures in the slide 42 and the support 8 carries at its other end a striker 54 which is operated to release the latch constituted by the rider 51, by engagement with a stub 55.

Turning now to the central section of the unloader, which does not rotate, the hopper 3 is of a similar shape to and has more or less the same capacity as a tray and comprises fixed backwalls and sidewalls 56, 57 and 58, of which wall 57 is shorter than wall 58 to provide an outlet for the cigarette stream 11, and a front wall constituted by upper and lower screens 59 and 60 which move vertically with the platform 7 and between which the platform 7 can move horizontally. The screens 59 and 60 are supported in vertically spaced-apart relationship between side members 73 which are formed with grooves along their vertical edges and which are located in tongued guides 61 mounted on the sidewalls 57 and 58. A guide plate 75 is provided to pack the cigarettes endwise as they descend.

The lower screen 60 is flexible and is wound at its lower end on a shaft 101 which is loaded to retract the screen 60 by two reels 102 onto which coil springs 103 are wound from smaller bobbins 104 as the screen is unwound. The upper end of the screen 60 is provided with a ledge 105 so that it can be raised into position by hand and a latch 106 by means of which it can be hooked on to a locking rib 107 on a frame supporting the platform 7. The platform 7 is carried on a frame comprising two side struts 62 and a cross strut 63. This frame is carried for movement along a rectangular path in a vertical plane by two pairs of chain conveyors each of which comprises an endless chain 65 running over a set of four pulleys 66 mounted at the corners of a rectangular plate 67 which is secured to one of the discs 13 by studs 68, each side strut being mounted at its ends on each chain of one pair of lugs 69. The arrangement operates to move the platform along a rectangular path down inside the hopper 3, to return it externally of the hopper and to move it transversely between these two travels. Driving power is applied to the two chains from a shaft 108 through gears 109 to a shaft 110 and connecting chains 111. On the shaft 108 there is mounted a "fail-safe" brake 112 which is actuated by a failure in the drive to the shaft 108 to clamp it to prevent free movement of the platform 7 which might be damaging. The return movement of the platform 7 is controlled by means of two switches: a first switch 113 adjacent the ramp 16 which indicates the presence of a filled tray 1 and which is operated by the movement of the tray along the ramp 16 into the tray holder 4, and a second switch 114 actuated by a striker 115. The switch 114 is only operative if a filled tray is waiting, as indicated by the switch 113, and acts to cause the platform to be returned rapidly to its top position. As the platform 7 reaches its uppermost position a switch 136 is actuated by a lug 137 to cause the platform 7 to be slowed down.

The downward movement of the platform 7 is controlled to exert pressure on the cigarettes beneath it for so long as there is any looseness in their packing. To achieve this a feeler plate 70 is disposed immediately beneath the platform and extends forward between the screens 59, 60 where it is formed with two upturned lugs 71. Each lug 71 is secured to a switch 72 carried on the cross strut 63 and connected in the power circuit for the endless chains 65 and each switch is actuated by relative vertical movement of its corresponding lug. The feeler plate 70 lies across the cigarettes and has some freedom to twist in the space between the screens 59 and 60. Thus when the platform 7 is exerting pressure on the whole layer of cigarettes beneath it the feeler plate 70 is horizontal and both switches 72 are in their uppermost, inoperative positions which causes the chains 65 to stop moving until the cigarettes below loosen and one end of the feeler plate 70 drops, operating one of the switches 72.

Cigarettes are run out of the hopper 3 in a continuous stream on two endless belt conveyors 81 and 82, the upper runs of which form the bottom of the hopper. Conveyor 82 is positioned with its upper run slightly above that of the other, the gap being closed by a bridge 83, and is run at a much slower speed, such as one-quarter of the speed of conveyor 81. This assists in accelerating the cigarettes in an orderly fashion without excessive rolling. The stream of cigarettes 11 is carried out of the unloader on conveyor 81 beneath sidewall 57, between two guides 84 and through apertures in disc 13 and support 8.

The operation of the machine, which has been described in general terms with reference to FIG. 1 will now be considered in more detail by describing the sequence of events commencing with the arrival of a full tray in the machine.

In the position shown in FIGS. 2 and 3 of the drawings the conveyor 10 has operated to carry an empty tray out of the unloader and to introduce the full tray 1 into the machine. The tray 1 is introduced endwise and fits snugly within the framework defined by the cross struts 18, which bear against the ribs 19 running across the back of the tray, the plate 85 and the upper surface of the ramp 10. Once the tray is in position the unloader is operated to rotate the tray through 180° to the unloading position where it is held stationary while the unloading proceeds.

At the commencement of this movement the tray is swung into a radial position. The tray holder 4 which carries the tray is released so that it shall be free to swing about the two pivots 20 by the engagement of the shoulders 38 with the cam blocks 39, which disengages the latch bars 33 from the rollers 36. The couple produced by the forward movement of the support pivots 20 and the ensuing reaction against the ramp 16 twists the tray holder 4, and thence the tray 1, in a clockwise direction (as viewed in FIG. 3) until the pegs 23 engage in the hooks 26 locking the tray in the radial position where the leaf 6 is a snug fit over the top of the tray.

Meanwhile the platform 7 which is supporting the stack of cigarettes from the preceding tray, tray 2, is lowering the stack into the magazine 3 as the cigarettes already in there are discharged on the conveyor 81. As the platform 7 reaches the lower limit of its vertical travel on the chains 65 the topmost layer of cigarettes on the stack passes out of the tray 2 into the magazine. The platform 7 then commences its horizontal travel on the chains 65 and is retracted from the hopper 3 whereupon the stack of cigarettes supported on the platform drops the short distance on to the cigarettes below. At this point the unloader is rotated and the platform continues its retraction in the vertical direction, the timing being arranged so that the upper screen 59 does not foul the outgoing tray 2.

Since the cigarettes do not quite fill the tray, and in any event the upper layers of tipped cigarettes lie with their untipped ends below their tipped ends, there is a gap between the cigarettes and the leaf 6 covering the top of the tray and when the tray is inverted the cigarettes drop a small distance as their weight is transposed to the leaf 6. In order that they shall drop in an orderly fashion, without undue twisting or crossing, it is necessary for them to fall along a vertical line. This is achieved by rotating the unloader between the two positions at a sufficiently fast speed to ensure that the centrifugal force acting on the cigarettes is sufficient to prevent them dropping until they are brought to rest in the unloading position, where the tray is vertical.

The incoming tray 1 arrives in the unloading position with the leaf in registration with the platform 7 which is synchronized to be at the top of its travel at this moment and which then proceeds along its upper horizontal path pushing the leaf 6 back under the cigarettes against spring 49 until the rider 51 drops into place holding the leaf 6 in the retracted position.

Having pushed back the leaf 6 and taken the weight of the cigarettes in the tray the platform 7 travels downwards until the feeler plate 70 is resting horizontally on the cigarettes below. The emptying of the tray then proceeds as previously described. On the next movement of the unloader the emptied tray is brought down to the lower position where it is exchanged for a further full tray. Before this exchange can take place the tray holder has to be released, moved into the vertical position and locked there and the leaf 6 has to move into its operative position. This is all achieved by the cam arrangements which have been described which are operated by the last part of the movement into the lower position. Engagement of the strikers 54 with the stubs 55 lifts the retaining riders 51 and allows the leaf 6 to move back into position under the action of springs 49. Similarly engagement of the rollers 29 with the cam blocks 30 unlatches the arms 25 from the pegs 23 releasing the tray holder to swing under its own weight about the pivots 20 until it comes into the position shown where it is located by the engagement of the U-pieces 17 with the stops 21 and of the bottom of the tray with the ramp 15. As the tray holder swings the rollers 36 run along the latch bars 33 until they lock in the recesses in the ends thereof, thereby locking the tray holder in the tilted position.

The conveyor 10 is now operated to replace the empty tray with a full one, and the cycle of operation is completed.

The modified tray unloader shown in FIGS. 4 and 5 is designed to perform on the trays and cigarettes the same operations as have so far been described but the mechanism for handling the trays is simplified.

The trays are delivered to and removed from the tray holders 4 by a carriage 116 mounted on a conveyor 117 which reciprocably moves the carriage 116 between the position shown in FIG. 4 and a position outside the tray unloader to the right thereof where it exchanges empty trays for full ones.

The trays are tilted into and out of a radial position by a mechanism comprising a roller 118 mounted on the tray holder 4 which latter is pivotally mounted at 119, and fixed cams 120 and 121 which control the movement of the roller 118 and thereby control the swinging of the tray holder 4 about its pivots. The cam 121 extends from the point shown about three-quarters of the way around the machine. As the machine rotates anticlockwise from the position shown in FIG. 5, the weight of a tray in the tray holder 4 swings it back to a radial position against a stop 122, this movement being controlled by the roller 118 running up the front face of cam 120. The tray holder 4 is held in the radial position when the roller 118 runs under the cam 121. It is returned to the tilted position by the roller 118 running down the backface of the cam 120.

The leaf 6 is moved to and fro along slide rods 123 which support it by pivot arms 124 which are secured to a shaft 125, which is biased to rotate by constant pressure coil springs 126 carried on spools 127. The rotation of the shaft 125 is controlled by a ratchet 128 and a pawl 129 pivoted at 135 and biased into engagement therewith by a spring 130. A cam 131 is fixed in a position to be struck by a roller 132 carried on the pawl 129 as the unloader rotates into the position shown. In this position the leaf 6 is advanced and prevented from moving off the slide rods 123 by engagement of the pawl 129 with a notch 133 in the ratchet 128. In the upper position of the tray holder 4 the travelling platform 7 pushes the leaf 6 back along the slide rods 123 against the springs 126 until the pawl 129 locks into a notch 134 in the ratchet 128. Engagement of the roller 132 with the cam 131 lifts the pawl 129 releasing the ratchet 128 allowing the leaf 6 to move forward under the action of the springs 126.

What I claim as my invention and desire to secure by Letters Patent is:

1. A method of producing a continuous stream of parallelly aligned rodlike articles moving transversely to their lengths, comprising emptying the articles downwardly out of each in turn of a succession of containers charged with articles in parallel alignment into a hopper having sides to limit horizontal movement of the articles, constraining the articles against relative vertical movement during downward descent through the hopper to assist in maintaining their alignment, and continuously removing the articles from the hopper, in a direction transverse to their direction of downward movement through the hopper, to form said stream.

2. A method according to claim 1 wherein there is produced in the hopper a mass of articles from which said stream is formed, and comprising constraining the mass to define a generally flat and horizontal upper surface thereto.

3. A method according to claim 1 further comprising urging the articles downwardly through the hopper.

4. A method according to claim 1 comprising lowering the articles downwardly from each container in turn into the hopper and supporting the articles during their downward movement.

5. A method according to claim 1 wherein the containers have an article-supporting bottom and an open top, comprising inverting the containers in succession to empty the articles out through the open top.

6. A method according to claim 5 wherein the containers are inverted by moving them in succession along a circular path from a position below the hopper, where charged containers are delivered and empty containers removed, to a position above the hopper where they are emptied into the hopper.

7. A method according to claim 1 wherein the articles are cigarettes and the containers are trays for the cigarettes.

8. Apparatus for forming a continuous stream of parallelly aligned rodlike articles moving transversely to their lengths from containers charged with the articles in parallel alignment, comprising a hopper for the articles having sides to limit horizontal movement of the articles, means to deliver the charged containers in succession to the hopper, means to transfer articles downwardly into the hopper from each in turn of the containers, means to remove articles continuously from the hopper, in a direction transverse to their lengths and transverse to their direction of downward movement through the hopper, to form the continuous stream, and means to constrain the articles against relative vertical movement during downward descent through the hopper to assist in maintaining their alignment.

9. Apparatus according to claim 8 wherein the continuous stream of articles is produced from a mass of articles in the hopper, and comprising means to constrain the mass to define a generally flat and horizontal upper surface thereto.

10. Apparatus according to claim 8 comprising means to urge the articles downwardly through the hopper.

11. Apparatus according to claim 9 comprising a horizontal platform which is vertically movable in the hopper to act on the upper level of articles in the hopper.

12. Apparatus according to claim 8 comprising means to lower the articles downwardly from each container in turn into the hopper and to support the articles during their downward movement.

13. Apparatus according to claim 12 comprising a moving platform to lower the articles and to support them, which platform is retractable horizontally to allow supported articles to rest on articles already in the hopper.

14. Apparatus according to claim 13 wherein the platform is as thin as possible to reduce to a minimum the downward distance travelled by supported articles upon retraction of the platform.

15. Apparatus according to claim 13 wherein the hopper has sides to limit horizontal movement of the articles transversely to their length and the platform is retractable in the direction of their lengths.

16. Apparatus according to claim 15 wherein the hopper is further provided with sides to limit endwise movement of the articles, one of which is vertically movable with the platform and is slotted to accommodate horizontal movement of the platform into and out of the hopper.

17. Apparatus according to claim 16 wherein the part of the movable side below the slot is flexible and is retracted onto or paid out from a reel as the side moves.

18. Apparatus according to claim 13 comprising means to position charged containers above the hopper so that articles in a container are in vertical alignment with the hopper and means to move the platform horizontally above the hopper into a position beneath the articles.

19. Apparatus according to claim 18 comprising a slide movable between a first supporting position beneath articles in a container above the hopper and a second unsupporting position horizontally displaced therefrom wherein the horizontal movement of the platform above the hopper is such as to move the slide from its first to its second position and to take the weight of articles in a container from the slide.

20. Apparatus according to claim 13 comprising drive means to move the platform through a path which is substantially rectangular in the vertical plane and which drive means includes at least one endless conveyor moving along a similar rectangular path around pulleys disposed at the corners thereof and means to support the platform on the conveyor.

21. Apparatus according to claim 13 comprising means to move the platform rapidly down the hopper until it engages the upper surface of the mass of articles already in the hopper and that surface is level and then to move it at the same speed as the mass.

22. Apparatus according to claim 21 including sensing means carried with the platform to detect when said upper surface is level.

23. Apparatus according to claim 22 wherein the sensing means comprises a sensor plate disposed beneath the platform to engage said upper surface and supported for limited free movement relative thereto and electric switch means actuated by movement of the sensor plate to indicate its disposition relative to the platform.

24. Apparatus according to claim 8 wherein the means to remove articles continuously from the hopper comprises a conveyor extending across the hopper to support articles therein, an aperture being provided in a sidewall of the hopper to permit egress of articles therefrom.

25. Apparatus according to claim 24 wherein a further, slower moving conveyor is provided to assist in supporting articles in the hopper and moving them across the hopper.

26. Apparatus according to claim 8 for handling containers having an article-supporting bottom and an open top, comprising inversion means to invert the containers in succession to deliver articles therein through their open tops to the hopper.

27. Apparatus according to claim 26 wherein the inversion means to invert the containers acts to move them in succession progressively along a circular path between a position below the hopper and a position above the hopper where they are emptied and wherein they are inverted during rotation, means being provided to close the open tops of the containers to retain the articles therein.

28. Apparatus according to claim 27 comprising a conveyor to deliver charged containers to and remove empty containers from the inversion means at the position below the hopper.

29. Apparatus according to claim 8 wherein the inversion means comprises a plurality of cradles each of which is formed to support one container and to receive it horizontally.

30. Apparatus according to claim 29 wherein each cradle is provided with means to tilt a container relative to the inversion means.

31. Apparatus according to claim 26 wherein the articles are cigarettes and the containers are trays.

32. A method of producing a continuous stream of parallelly aligned rodlike articles moving transversely to their lengths, comprising delivering a succession of batches of articles in containers to a discharge area, emptying the containers, constraining the sides of each discharged batch by means of substantially vertical sidewalls against horizontal movement while allowing the articles to move downwards and while contacting and maintaining the upper surface of the batch of articles substantially flat and horizontal and separated from the subsequently discharged batch, the upper surface being formed of a row of rodlike articles, and continuously removing articles from the bottom of successively discharged batches, in a direction transverse to their lengths and transverse to their direction of downward movement between the sidewalls, to form the said continuous stream.

33. Apparatus for discharging parallelly aligned rodlike articles moving transversely to their lengths from a succession of containers charged with batches of the articles in parallel alignment, comprising substantially vertical sidewall means for successively guiding downwards each batch of articles while constraining the batch against horizontal movement, means for delivering successive batches of articles into position for the discharge of each batch of articles downwards from said containers between said sidewall means, and horizontal plate means extending between said sidewall means for contacting the upper surface of each batch while it is moving downwards between said sidewall means to maintain the upper surface of the batch formed of a row of rodlike articles substantially flat and horizontal and separated from the subsequently discharged batch.

34. Apparatus according to claim 33, in which the said removal means comprises a first conveyor and a second conveyor arranged in series, the first conveyor being located upstream of the second conveyor and extending to a position adjacent the latter, and the second conveyor extending beyond the sidewall which is downstream in relation to the direction of movement of the stream, so as to carry the articles beyond the said sidewall.

35. Apparatus according to claim 34, in which the said first conveyor is at a higher level than the said second conveyor.

36. Apparatus according to claim 34, including means for driving the first conveyor at one speed and means for driving the second conveyor at a greater speed.